US009290329B2

(12) United States Patent
Egerton

(10) Patent No.: US 9,290,329 B2
(45) Date of Patent: Mar. 22, 2016

(54) ADJUSTABLE TRANSFER ASSEMBLY FOR CONTAINER MANUFACTURING PROCESS

(75) Inventor: Daniel Egerton, Skipton (GB)

(73) Assignee: Crown Packaging Technology, Inc., Alsip, IL (US)

(*) Notice: Subject to any disclaimer, the term of this patent is extended or adjusted under 35 U.S.C. 154(b) by 1 day.

(21) Appl. No.: 13/561,678

(22) Filed: Jul. 30, 2012

(65) Prior Publication Data
US 2012/0292159 A1 Nov. 22, 2012

Related U.S. Application Data

(63) Continuation of application No. 12/108,950, filed on Apr. 24, 2008, now Pat. No. 8,245,551.

(51) Int. Cl.
B65G 29/00 (2006.01)
B65G 47/84 (2006.01)
B21D 43/14 (2006.01)

(52) U.S. Cl.
CPC ............... B65G 29/00 (2013.01); B21D 43/14 (2013.01); B65G 47/848 (2013.01)

(58) Field of Classification Search
CPC .... B65G 29/00; B65G 47/843; B65G 47/848; B21D 43/14; B21D 43/18
USPC ......... 72/94, 405.03, 404, 405.01; 198/471.1, 198/867.03; 29/792, 785; 414/431, 432, 414/433
See application file for complete search history.

(56) References Cited

U.S. PATENT DOCUMENTS

| 137,400 A | 4/1873 | Ahrend |
| 548,888 A | 10/1895 | Noteman |
| 593,755 A | 11/1897 | Pond et al. |
| 1,459,584 A | 6/1923 | Ericsson |
| 1,498,940 A | 6/1924 | Wheeler |
| 1,621,301 A | 3/1927 | Wright |
| 2,467,278 A | 4/1949 | Thompson |
| 2,550,156 A | 4/1951 | Lyon |

(Continued)

FOREIGN PATENT DOCUMENTS

| CA | 2536841 | 2/2006 |
| DE | 19 39 623 A1 | 2/1970 |

(Continued)

OTHER PUBLICATIONS

Intech Corporation, "Intech Power-Core™ Non-Lubricated Gears Replace Metal Gears in Belvac Neckers Model 595, 795, Modular, etc.", Necker Gears, http://www.intechpower.com/productst/intech-can-making-machinery/necker-gears/, © 2011, accessed Sep. 23, 2011, 2 pages.

Primary Examiner — Edward Tolan
Assistant Examiner — Mohammad I Yusuf
(74) Attorney, Agent, or Firm — Baker & Hostetler LLP

(57) ABSTRACT

A transfer turret assembly is provided for transferring can bodies between process stations in a can necking machine. The transfer turret assembly includes a rotatable transfer starwheel. A plurality of pockets is formed in the starwheel that can each receive a can body. The turret assembly includes a vacuum assembly having a first zone that is under vacuum and a second zone separated from the first region by a boundary. The first zone vacuum retention force to vacuum ports formed in the pockets to retain the can bodies within the pockets. The boundary between the first zone and the second zone is adjustable to correspondingly adjust the vacuum retention force according to desired starwheel rotation speed.

18 Claims, 10 Drawing Sheets

(56) References Cited

U.S. PATENT DOCUMENTS

| | | | |
|---|---|---|---|
| 2,686,551 A | 8/1954 | Laxo | |
| 2,874,562 A | 2/1959 | Cross | |
| 2,928,454 A | 3/1960 | Laxo | |
| 2,940,502 A | 6/1960 | La | |
| 3,096,709 A | 7/1963 | Eldred et al. | |
| 3,143,366 A | 8/1964 | Nichols | |
| 3,268,054 A | 8/1966 | Murphy et al. | |
| 3,344,685 A | 10/1967 | Crouzet | |
| 3,374,684 A | 3/1968 | Greven | |
| 3,406,648 A | 10/1968 | David | |
| 3,418,837 A | 12/1968 | Dirk et al. | |
| 3,531,967 A | 10/1970 | Werge | |
| 3,591,047 A * | 7/1971 | Buhle | 221/151 |
| 3,599,780 A | 8/1971 | Sorbie | |
| 3,621,530 A | 11/1971 | Pflieger et al. | |
| 3,635,069 A | 1/1972 | Eickenhorst | |
| 3,659,443 A | 5/1972 | Ball | |
| 3,687,098 A | 8/1972 | Maytag | |
| 3,786,957 A | 1/1974 | Hilgenbrink | |
| 3,797,429 A | 3/1974 | Wolfe | |
| 3,812,696 A | 5/1974 | Kneusel et al. | |
| 546,631 A | 2/1976 | Traczyk et al. | |
| 3,964,412 A | 6/1976 | Kitsuda | |
| 3,983,729 A | 10/1976 | Traczyk et al. | |
| 4,030,432 A | 6/1977 | Miller et al. | |
| 4,164,997 A | 8/1979 | Mueller | |
| 4,181,050 A * | 1/1980 | Stroobants et al. | 82/56 |
| 4,224,818 A | 9/1980 | Jones et al. | |
| 4,261,193 A | 4/1981 | Boik | |
| 4,341,103 A | 7/1982 | Escallon et al. | |
| 4,391,372 A * | 7/1983 | Calhoun | 209/523 |
| 4,446,714 A | 5/1984 | Cvacho | |
| 4,457,160 A | 7/1984 | Wünsch | |
| 4,462,467 A | 7/1984 | Weingartner | |
| 4,513,595 A | 4/1985 | Cvacho | |
| 4,514,071 A | 4/1985 | Koninger et al. | |
| 4,519,232 A | 5/1985 | Traczyk et al. | |
| 4,576,024 A | 3/1986 | Weber | |
| 4,584,903 A | 4/1986 | Hirt et al. | |
| 4,590,788 A | 5/1986 | Wallis | |
| 4,593,369 A | 6/1986 | Thompson | |
| 4,624,098 A | 11/1986 | Trendel | |
| 4,671,093 A | 6/1987 | Dominico et al. | |
| 4,685,556 A | 8/1987 | Joseph | |
| 4,693,108 A | 9/1987 | Traczyk et al. | |
| 4,732,027 A | 3/1988 | Traczyk et al. | |
| 4,773,250 A | 9/1988 | Miyazaki | |
| 4,774,839 A | 10/1988 | Caleffi et al. | |
| 4,817,409 A | 4/1989 | Bauermeister | |
| 4,838,064 A | 6/1989 | Paess | |
| 4,892,184 A | 1/1990 | Vander Griendt et al. | |
| 4,945,954 A | 8/1990 | Wehrly et al. | |
| 5,105,649 A | 4/1992 | Hite et al. | |
| 5,209,101 A | 5/1993 | Finzer | |
| 5,226,303 A | 7/1993 | Dieden et al. | |
| 5,235,839 A | 8/1993 | Lee, Jr. et al. | |
| 5,245,848 A | 9/1993 | Lee, Jr. et al. | |
| 5,282,375 A | 2/1994 | Lee, Jr. et al. | |
| 5,297,414 A | 3/1994 | Sainz | |
| 5,301,530 A | 4/1994 | Beelen et al. | |
| 5,349,836 A | 9/1994 | Lee, Jr. | |
| 5,353,619 A | 10/1994 | Chu et al. | |
| 5,370,472 A | 12/1994 | Muellenberg | |
| 5,398,603 A | 3/1995 | Hartmann et al. | |
| 5,467,628 A | 11/1995 | Bowlin et al. | |
| 5,469,729 A | 11/1995 | Hager | |
| 5,497,900 A | 3/1996 | Caleffi et al. | |
| 5,540,320 A | 7/1996 | Sarto et al. | |
| 5,553,826 A | 9/1996 | Schultz | |
| 5,611,231 A | 3/1997 | Marritt et al. | |
| 5,634,364 A | 6/1997 | Gardner et al. | |
| 5,676,006 A | 10/1997 | Marshall | |
| 5,713,235 A | 2/1998 | Diekhoff | |
| 5,724,848 A | 3/1998 | Aschberger | |
| 5,755,130 A | 5/1998 | Tung et al. | |
| 5,761,945 A | 6/1998 | Vandenbroucke | |
| 5,778,722 A | 7/1998 | Saikai et al. | |
| 5,782,308 A | 7/1998 | Latten et al. | |
| 5,882,178 A | 3/1999 | Hudson et al. | |
| 5,906,120 A | 5/1999 | Thacker et al. | |
| 6,032,502 A | 3/2000 | Halasz et al. | |
| 6,055,836 A | 5/2000 | Waterworth et al. | |
| 6,085,563 A | 7/2000 | Heiberger et al. | |
| 6,094,961 A | 8/2000 | Aschberger | |
| 6,134,930 A | 10/2000 | Shore et al. | |
| 6,164,109 A | 12/2000 | Bartosch | |
| 6,167,743 B1 | 1/2001 | Marritt et al. | |
| 6,176,006 B1 | 1/2001 | Milliman | |
| 6,178,797 B1 | 1/2001 | Marshall et al. | |
| 6,199,420 B1 | 3/2001 | Bartosch | |
| 6,205,926 B1 | 3/2001 | Dufour | |
| 6,240,760 B1 | 6/2001 | Heiberger et al. | |
| 6,571,986 B1 | 6/2003 | Simmons | |
| 6,637,247 B2 * | 10/2003 | Bowlin | 72/94 |
| 6,644,083 B2 | 11/2003 | Pakker | |
| 6,658,913 B1 | 12/2003 | Zanzerl et al. | |
| 6,661,020 B2 | 12/2003 | Schill et al. | |
| 6,672,122 B2 | 1/2004 | Mustread et al. | |
| 6,698,265 B1 | 3/2004 | Thomas | |
| 6,725,780 B2 | 4/2004 | Berti et al. | |
| 6,752,000 B2 | 6/2004 | Reynolds et al. | |
| 6,779,651 B1 | 8/2004 | Linglet et al. | |
| 6,827,018 B1 | 12/2004 | Hartmann et al. | |
| 6,899,358 B2 | 5/2005 | Richardson | |
| 6,902,107 B2 | 6/2005 | Shay et al. | |
| 6,911,752 B1 | 6/2005 | Breit et al. | |
| 7,028,857 B2 | 4/2006 | Peronek | |
| 7,069,765 B2 | 7/2006 | Grove et al. | |
| 7,100,417 B2 | 9/2006 | Yamanaka et al. | |
| 7,341,077 B2 | 3/2008 | Sampers | |
| 7,404,309 B2 | 7/2008 | Schill et al. | |
| 7,963,139 B2 | 6/2011 | Shortridge | |
| 8,006,826 B2 * | 8/2011 | Licht | 198/471.1 |
| 8,096,156 B2 * | 1/2012 | Olson et al. | 72/94 |
| 2002/0029599 A1 | 3/2002 | Heiberger | |
| 2002/0148266 A1 | 10/2002 | Heiberger et al. | |
| 2004/0050668 A1 | 3/2004 | Bowlin et al. | |
| 2004/0069027 A1 | 4/2004 | Fukushima | |
| 2005/0193796 A1 | 9/2005 | Heiberger et al. | |
| 2006/0070470 A1 | 4/2006 | McGill et al. | |
| 2006/0101884 A1 | 5/2006 | Schill et al. | |
| 2006/0101885 A1 | 5/2006 | Schill et al. | |
| 2006/0101889 A1 | 5/2006 | Schill et al. | |
| 2006/0104745 A1 | 5/2006 | Schill et al. | |
| 2007/0227218 A1 | 10/2007 | Shortridge | |
| 2007/0227320 A1 | 10/2007 | Marshall | |
| 2007/0227859 A1 | 10/2007 | Marshall et al. | |
| 2007/0249424 A1 | 10/2007 | Marshall et al. | |
| 2007/0251803 A1 | 11/2007 | Schill et al. | |
| 2007/0283544 A1 | 12/2007 | Schill et al. | |
| 2007/0283665 A1 | 12/2007 | Schill et al. | |

FOREIGN PATENT DOCUMENTS

| | | |
|---|---|---|
| DE | 101 56 085 A1 | 5/2003 |
| EP | 0349521 | 1/1990 |
| EP | 0537772 | 4/1993 |
| EP | 0 885 076 | 7/2002 |
| FR | 2876305 | 4/2006 |
| FR | 2 881 123 A1 | 7/2006 |
| GB | 189707306 | 3/1898 |
| GB | 2173437 A | 10/1986 |
| JP | 05 305373 | 11/1993 |
| JP | 2001-18328 | 1/2001 |
| JP | 2002 102968 | 4/2002 |
| JP | 2003-237752 | 8/2003 |
| JP | 2003 251424 | 9/2003 |
| JP | 2003-252321 | 9/2003 |
| JP | 2003-320432 | 11/2003 |
| JP | 2004-002557 | 1/2004 |
| JP | 2004-130386 | 4/2004 |
| JP | 2004160468 | 6/2004 |
| JP | 2004-217305 | 8/2004 |
| JP | 2005-022663 | 1/2005 |

(56) References Cited

FOREIGN PATENT DOCUMENTS

| | | |
|---|---|---|
| JP | 2006-176140 | 7/2006 |
| JP | 2006-176183 | 7/2006 |
| WO | WO 94/12412 | 6/1994 |
| WO | WO 97/37786 A1 | 10/1997 |
| WO | WO 97/49509 | 12/1997 |
| WO | WO 00/23212 A | 4/2000 |
| WO | WO 2006/055185 A | 5/2006 |
| WO | WO 2006/067207 | 6/2006 |
| WO | WO 2006/067901 | 6/2006 |
| WO | WO 2006/077335 | 7/2006 |
| WO | WO 2006/095215 | 9/2006 |

\* cited by examiner

ADJUSTABLE TRANSFER ASSEMBLY FOR CONTAINER MANUFACTURING PROCESS

CROSS-REFERENCE TO RELATED APPLICATION

This application is a continuation of U.S. patent application Ser. No. 12/108,950, filed Apr. 24, 2008, the disclosure of which is hereby incorporated by reference as if set forth in its entirety.

BACKGROUND

The present invention relates to apparatuses for manufacturing containers. More particularly, the present invention relates to an apparatus for transferring container bodies between stages in a container manufacturing process.

Metal beverage cans are designed and manufactured to withstand high internal pressure—typically 90 or 100 psi. Can bodies are commonly formed from a metal blank that is first drawn into a cup. The bottom of the cup is formed into a dome and a standing ring, and the sides of the cup are ironed to a desired can wall thickness and height. After the can is filled, a can end is placed onto the open can end and affixed with a seaming process.

It has been the conventional practice to reduce the diameter at the top of the can to reduce the weight of the can end in a process referred to as necking. Cans may be necked in a "spin necking" process in which cans are rotated with rollers that reduce the diameter of the neck. Most cans are necked in a "die necking" process in which cans are longitudinally pushed into dies to gently reduce the neck diameter over several stages. For example, reducing the diameter of a can neck from a conventional body diameter of 2-$11/16^{th}$ inches to 2-$6/16^{th}$ inches (that is, from a 211 to a 206 size) often requires multiple stages, often 14.

Each of the necking stages typically includes a main turret shaft that carries a starwheel for holding the can bodies, a die assembly that includes the tooling for reducing the diameter of the open end of the can, and a pusher ram to push the can into the die tooling. Each necking stage also typically includes a transfer turret assembly that receives can bodies from a previous or upstream stage and delivers the can bodies to a subsequent or downstream stage.

Conventional transfer turret assemblies typically include a rotating transfer starwheel that includes a plurality of pockets that each retain a received can body under a vacuum force. The vacuum pressure of each pocket abates once the pocket has rotated to a predetermined angular exit position, at which point the can bodies exit the transfer turret pocket and are received by a complementary starwheel pocket of a downstream station. The vacuum is thus set to abate once the pocket has rotated to an angular position that provides for a transfer time that allows the can body to travel into the complementary pocket of the downstream starwheel as the starwheels rotate at a given rate.

While the vacuum abatement location may provide for accurate transfers at a given rotational speed, the capability to operate die necking processes at variable speeds has become desirable to control the quantity of can bodies produced over a given period of time. Unfortunately, varying the starwheel rotational speeds can remove the exit and intake pockets from proper operational alignment due to the resulting varying transfer times, which can cause can bodies to be dropped or crushed during operation, and may use the vacuum ineffectively by providing a period during which vacuum force is applied but no can is located in the pocket.

SUMMARY

A transfer turret assembly is provided for a can necking machine. The transfer turret assembly includes a rotatable transfer starwheel configured to transfer can bodies between a first and second process station. The transfer starwheel includes a plurality of peripheral pockets, each pocket being adapted to receive a can body and including a vacuum port. A stationary vacuum assembly includes a first zone that is under vacuum and a second zone separated from the first zone by a boundary. The first zone applies a vacuum retention force to a portion of the vacuum ports of a corresponding portion of pockets to retain the can bodies within the portion of pockets. The boundary between the first zone and second zone is adjustable to correspondingly adjust the vacuum retention force according to desired starwheel rotation speed.

These and other aspects of the invention are not intended to define the scope of the invention for which purpose claims are provided. In the following description, reference is made to the accompanying drawings, which form a part hereof, and in which there is shown by way of illustration, and not limitation, a preferred embodiment of the invention. Such embodiment also does not define the scope of the invention and reference must therefore be made to the claims for this purpose

BRIEF DESCRIPTION OF THE DRAWINGS

The following drawings are presented by way of illustration, and not limitation, in which like reference numerals correspond to like elements throughout, and in which.

DETAILED DESCRIPTION

An example embodiment of a transfer turret assembly configured to transfer can bodies between stages in a manufacturing process is described herein. The present invention is not limited to the disclosed configuration, but rather encompasses use of the technology disclosed in any container or can manufacturing application as defined by the appended claims.

Figure 1:
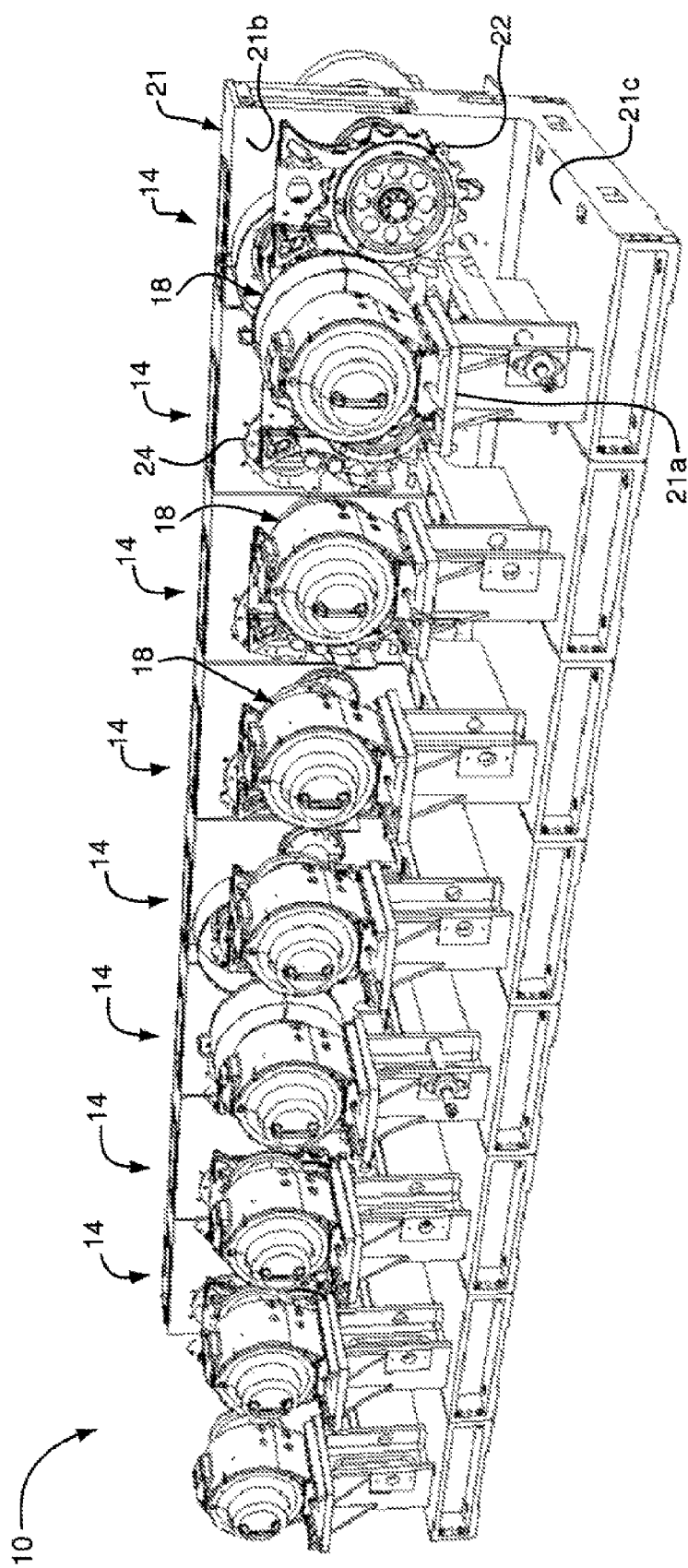
FIG. 1 is a perspective view of a multi-stage can necking machine constructed in accordance with certain aspects of the present invention.

Referring to FIG. 1, a multi-stage can necking machine 10 can include several can body process stations carried by a support structure 21 or alternative support structure. For instance, the machine can include several necking stages 14, each including a necking station 18 that is adapted to incrementally reduce the diameter of an open end of a can body 24. The support structure 21 includes a pedestal 21a at its front for supporting a bearing housing, and an upright support 21b at its rear end for supporting bearings for the turret shaft and transfer shaft, and a base 21c connecting the pedestal 21a and upright support 21b.

Each necking station 18 can include a main turret having a plurality of pockets formed therein. Each pocket is adapted to receive the can body 24 and securely holds the can body 24 in place by mechanical means and compressed air, as is understood in the art. Using techniques well known in the art of can making, an open end of the can body 24 is brought into contact with a die by a pusher ram (not shown in the figures) as the turret carries the can body 24 through an arc along a top portion of the necking station 18.

The annular die, in cross section, can typically include a lower cylindrical surface with an inner dimension substantially equal to the outer diameter of the can body 24, a curved transition zone, and a reduced diameter upper cylindrical surface above the transition zone. During the necking operation, the can body 24 is moved into the die such that the open end of the can body 24 is placed into touching contact with the transition zone of the die. As the can body 24 is moved further into the die, the upper region of the can body is forced past the transition zone into a snug position between the inner reduced diameter surface of the die and a form control member or sleeve located at the distal portion of the punch. The diameter of the upper region of the can is thereby reduced by the die. A curvature is also imparted onto the can wall corresponding to the surface configuration of the transition zone of the die. The can is then pushed out of the die.

The can body 24 may be passed through any number of necking stations 18 depending on the desired diameter of the open end of the can body 24. For example, multi-stage can necking machine 10 includes eight stages 14, and each stage incrementally reduces the diameter of the open end of the can body 24 as described above.

Figure 3:
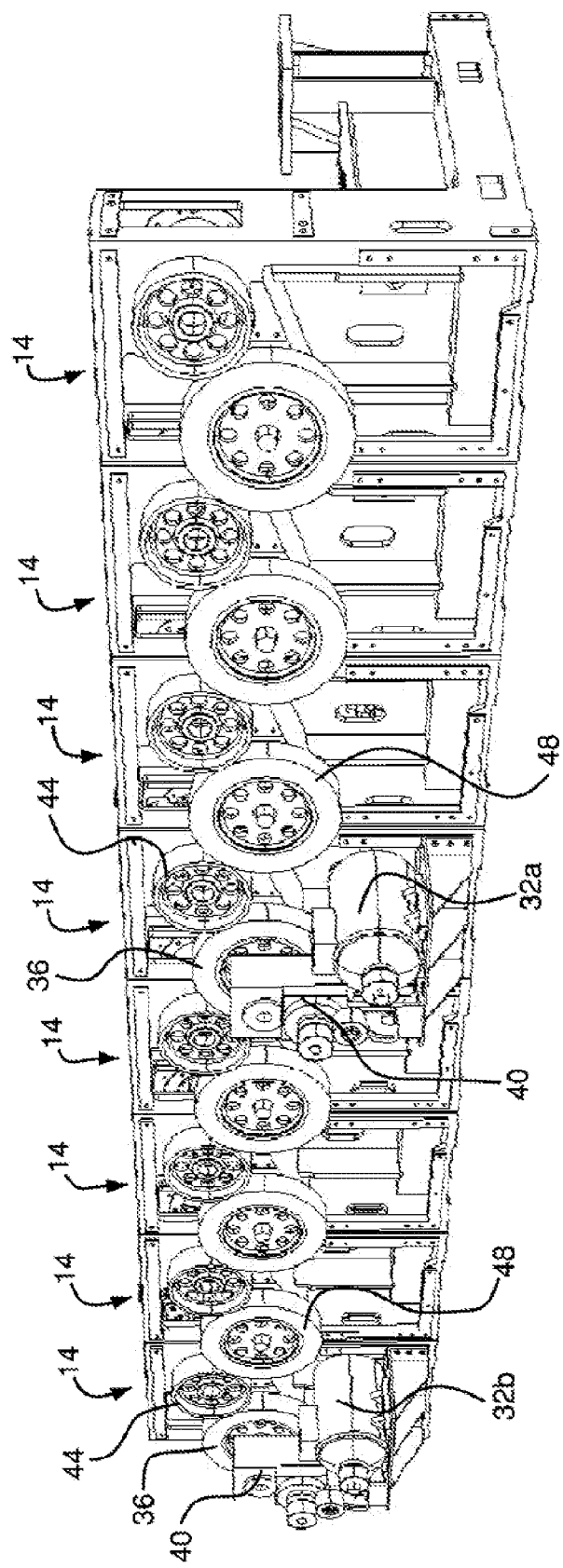
FIG. 3 is a perspective view of a back side of the multi-stage can necking machine illustrated in FIG. 1.

As shown in FIG. 3, the multi-stage can necking machine 10 may include several motors 32 to drive the starwheels and turrets of each necking stage 14 as described in co-pending U.S. patent application filed on even date herewith under Attorney Docket Number CC-5164, and entitled "Distributed Drives For a Multi-Stage Can Necking Machine," the disclosure of which is hereby incorporated by reference as if set forth in its entirety herein. As shown, there may be one motor 32 per every four necking stages 14.

Each motor 32 is coupled to and drives a first gear 36 by way of a gear box 40. The motor driven gear 36 then drives an adjacent second gear 44 which in turn drives a third gear 48 and so on. As shown, motor 32a drives the gears of four necking stages 14 and motor 32b drives the gears of the remaining four necking stages 14. The angular position of the gears can be manually adjusted in the manner described in co-pending U.S. patent application filed on even date herewith under Attorney Docket Number CC-5165, and entitled "Container Manufacturing Process Having Front-End Winder Assembly," the disclosure of which is hereby incorporated by reference as if set forth in its entirety herein.

In addition to the can necking stations 18, the can necking machine 10 can include a conventional input station and a waxer station disposed at an inlet of the necking stages 14 (not shown), and can further include a bottom reforming station that forms a bottom portion of each can body 24, a flanging station that prepares the cam rim for seaming, and a light testing station positioned at an outlet of the necking stages 14 that determines whether each can body is structurally sound. Accordingly, unless otherwise specified, the term "process station" is intended to encompass any or all of the above-identified stations, or any additional stations or apparatus (such as an input chute) that can be included in a can necking process. The waxer station can be configured as described in co-pending U.S. patent application filed on even date herewith under Attorney Docket Number CC-5161 and entitled "Apparatus for Rotating a Container Body," the disclosure of which is hereby incorporated by reference as if set forth in its entirety herein.

Referring again to FIG. 1, the can necking machine 10 further includes a plurality of transfer turret assemblies 22 supported by the upright support 21b or alternative support structure. Each transfer turret assembly 22 can be associated with each of the various process stations of the can necking machine 10, and is operable to transfer the can bodies from a first upstream process station, which has finished processing the can body, to a second downstream process station for further processing.

Figure 2:
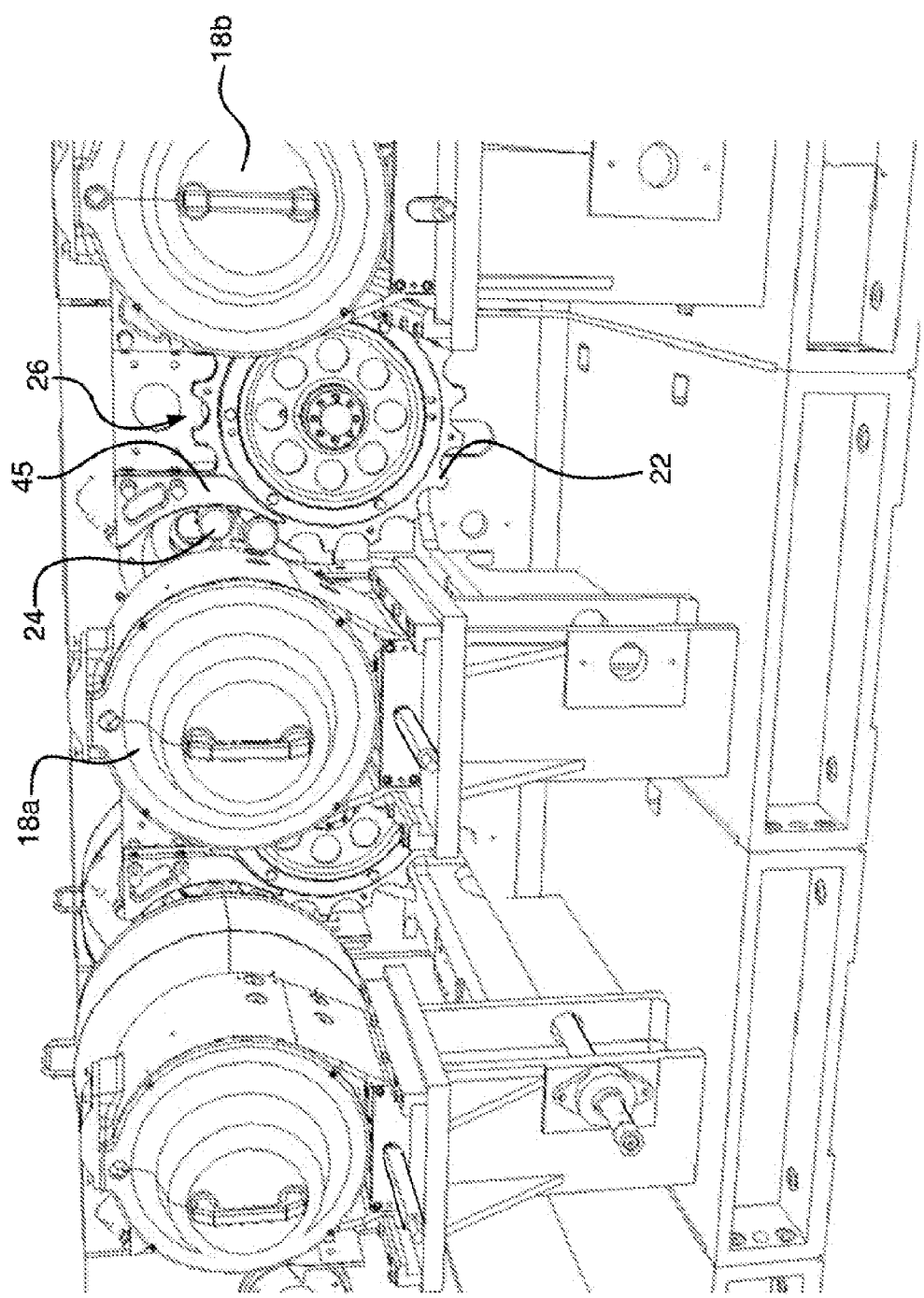
FIG. 2 is an enlarged perspective view of a portion of the multi-stage can necking machine illustrated in FIG. 1.
Figure 11:
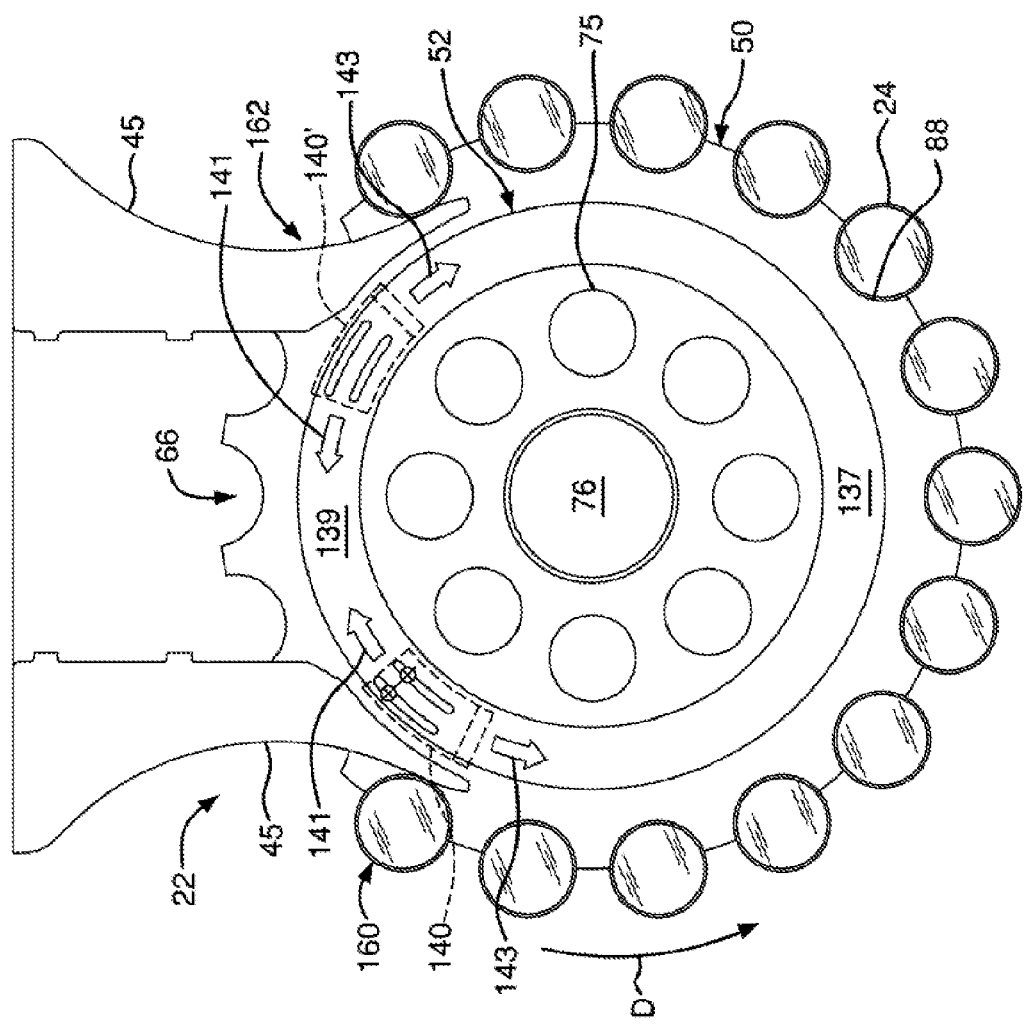
FIG. 11 is a front elevation view of the transfer turret assembly illustrated in FIG. 5.

For instance, in the illustrated embodiment, after the diameter of the end of the can body 24 has been reduced by a first necking station 18a, the first necking station 18a transfers the can body 24 to the transfer turret assembly 22 which, in turn, deposits the can body 24 into one of the pockets of the turret of an adjacent necking station 18b. Guides 45 (as shown in FIGS. 2 and 11) can aid in the can body transfer. The necking station 18b further reduces the diameter of the end of the can body 24 in substantially the manner described above. The can necking machine pockets can be monitored and controlled as described in co-pending U.S. Patent Application filed on even date herewith under Attorney Docket Number CC-5166 and entitled "Systems and Methods For Monitoring And Controlling A can Necking Process," the disclosure of which is hereby incorporated by reference as if set forth in its entirety herein.

Figure 4:
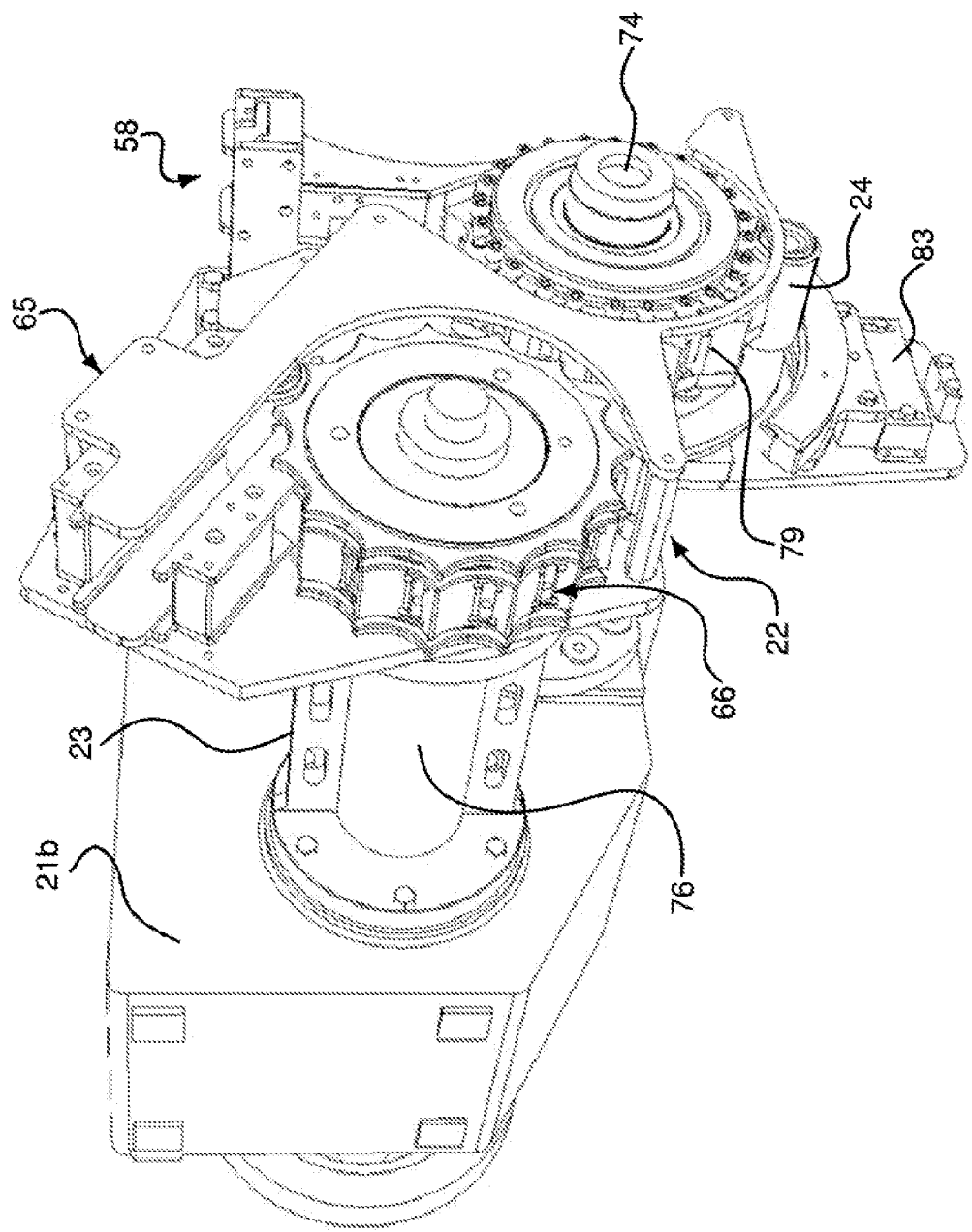
FIG. 4 is a perspective view illustrating an example infeed transfer turret assembly of the can necking machine illustrated in FIG. 1, disposed adjacent a waxer station.

Referring now to FIG. 4, in another embodiment, the transfer turret assembly 22 is illustrated as being mounted to a horizontal support 23 that is, in turn, mounted onto the upright support 21b. The transfer turret assembly 22 is illustrated as being disposed upstream of a waxer station 58 that can be coupled, for instance, to an inlet of a multi-stage can necking machine. The transfer turret assembly 22 can therefore also be provided as an infeed transfer turret assembly. As illustrated, an input chute 65 is operable to deliver can bodies to pockets 66 of a rotating starwheel 50 that is coupled to a rotating shaft 76. As the starwheel 50 rotates, the received can bodies are delivered to the downstream process station, which is the waxer station 58 having a housing 60, a turret 79 mounted onto a rotating shaft 74, and a lubricating station 83 in the illustrated embodiment.

It should be appreciated that the transfer turret assembly 22 can alternatively transfer can bodies from any upstream process station to any downstream process station of the can necking machine, depending on the sequential arrangement of the manufacturing stations. The main turrets and transfer starwheels of the can necking machine 10 can be configured in the manner described in co-pending U.S. patent application filed on even date herewith under Attorney Docket Number CC-5167 and entitled "High Speed Necking Configuration,"

the disclosure of which is hereby incorporated by reference as if set forth in its entirety herein. The transfer turret assembly 22 will now be described in more detail with reference to FIGS. 5-11.

Figure 5:
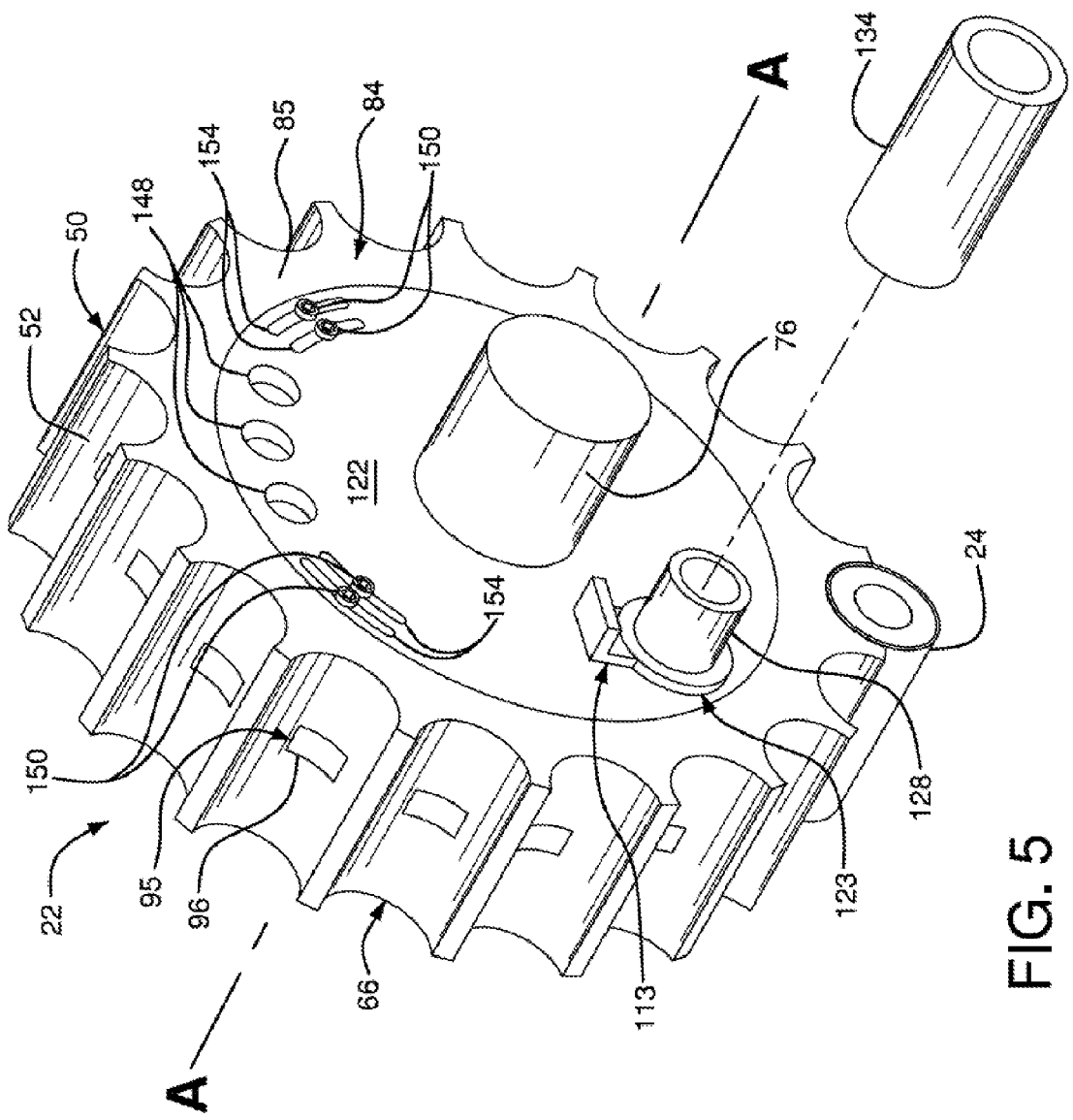
FIG. 5 is an enlarged perspective view of an example transfer turret assembly of the can necking machine illustrated in FIG. 1, including a transfer starwheel and a vacuum assembly.
Figure 6:
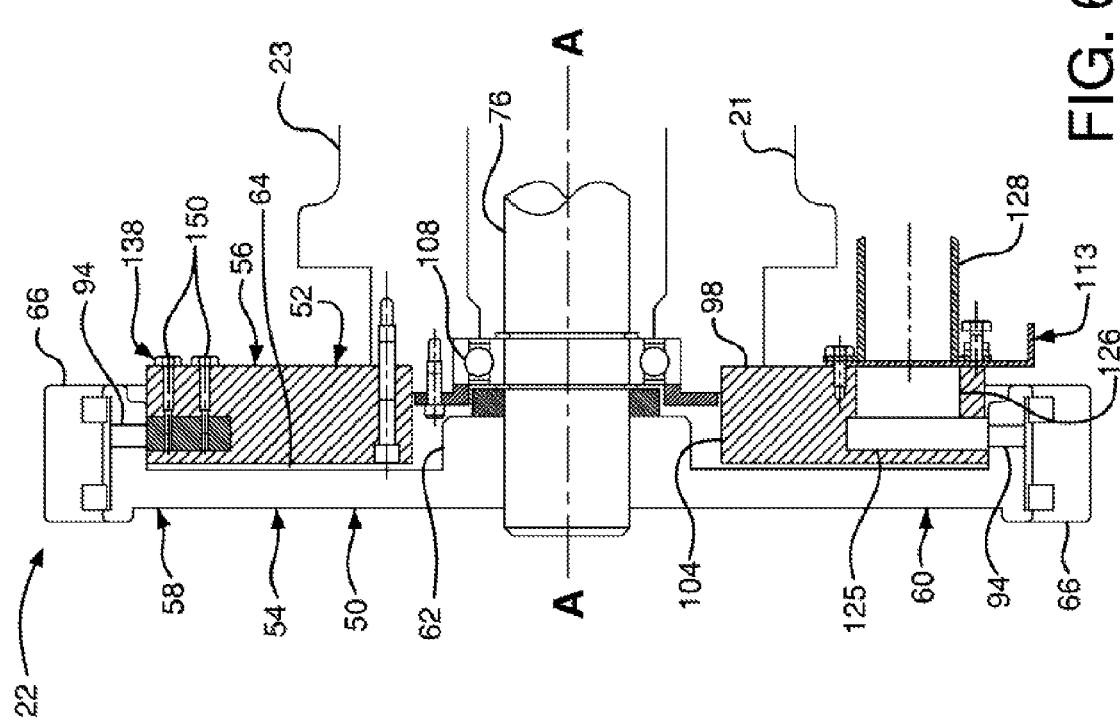
FIG. 6 is a sectional elevation view of the transfer turret assembly illustrated in FIG. 5.

Referring in particular to FIGS. 5 and 6, the transfer turret assembly 22 includes the transfer starwheel 50 that is juxtaposed with a vacuum assembly 52. A rotatable transfer turret shaft 76 extends through the vacuum assembly 52 and is rotatable relative to the fixed vacuum assembly 52. The shaft 76 is further coupled to the transfer starwheel 50 such that the starwheel 50 and shaft 76 rotate together with respect to the vacuum assembly 52. The transfer starwheel 50 carries a plurality of pockets 66 at its radial periphery.

Each pocket 66 includes a vacuum port 96 that is configured to retain a can body 24 under retention forces created by a negative, or vacuum, pressure induced in the each pocket 66 through the associated vacuum port 96. Specifically, a conduit 134 of a vacuum source can be coupled to a vacuum source inlet tube 128 to draw air through the vacuum ports 96. The rotating pockets 66 can thus each receive a can body 24 from an upstream process station and deliver the can body 66 to a downstream process station.

The starwheel 50 and assembly 52 can be substantially cylindrical, and extend axially along a horizontal axis A-A. The transfer turret assembly 22 and components of the transfer turret assembly 22 thus define a front end 54 and an opposing axially spaced rear end 56. The directional term "rear" and derivatives thereof are used herein to refer to an axial direction parallel to axis A-A from the front end 54 toward the rear end 56, and the directional term "front" and derivatives thereof are used herein to refer to an axial direction parallel to axis A-A from the rear end 56 toward the front end 54. The directional term "radial" refers to a direction perpendicular to axis A-A. The terms "radially inner" and "radially outer" are used with reference to axis A-A. The transfer turret assembly 22 defines an upper end 58 disposed above axis A-A, and a lower end 60 disposed below axis A-A.

The starwheel 50 can be formed from conventional steel or like metal, or can alternatively be formed form a polymer as desired. The starwheel 50 and its components can therefore be integrally formed as illustrated, or can be attached to each other using any known suitable mechanical fastener as described below. The vacuum assembly 52 can be formed from a softer material, such as a thermoplastic, fiber-reinforced plastic, composite, or like material. The vacuum assembly 52 and its components can also be integrally formed as illustrated, or can be attached to each other using any known suitable mechanical fastener as described below.

Figure 7:
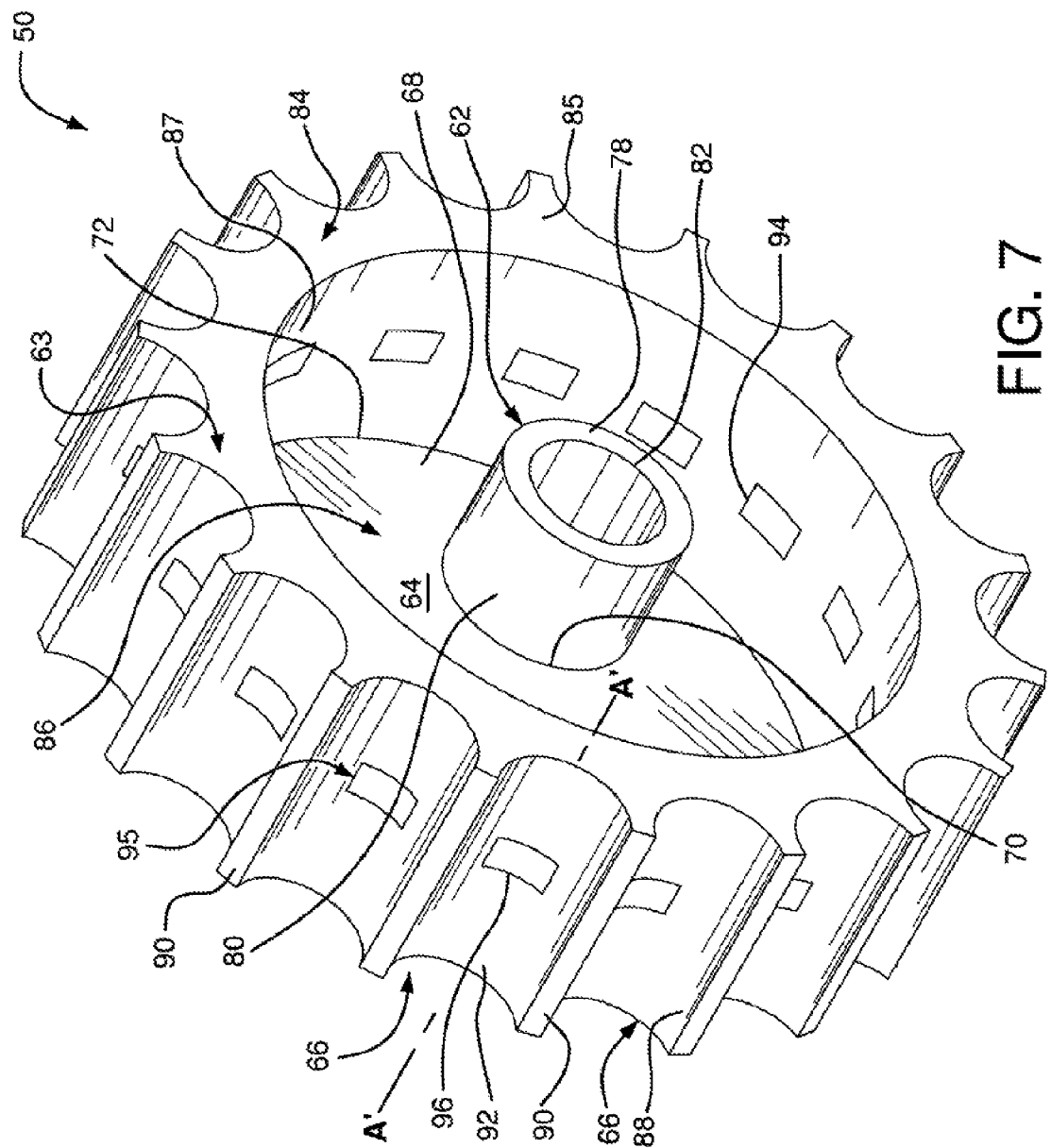
FIG. 7 is perspective view of the transfer starwheel illustrated in FIG. 5.

The starwheel 50 will now be described in more detail with further reference to FIGS. 6 and 7. In particular, the starwheel can include a hub 62, a front plate 64 extending radially outward from the hub 62, and an outer can retention assembly 63 supported by the front plate 64.

The front plate 64 can define a vertically oriented annular body defining an inner radial end 70 and an outer radial end 72. The front plate 64 can extend axially rearward from the front end 54 of the turret transfer assembly 22 and terminates at a rear annular surface 68.

The hub 62 can also define an annular body that extends axially rearward from the rear annular surface 68 of the front plate 64, and terminates at a rear annular surface 78. The hub 62 extends radially inward from the radially inner end 70 of the front plate 64, and defines an outer radial surface 80 extending between the rear annular surface 68 of the front plate 64 and the rear annular surface 78 of the hub 68. The rear annular surface 78 of hub 62 is thus disposed rearward with respect to the rear annular surface 68 of the front plate 64. A central opening 82 can extend axially through the hub 62. The central opening 82 can be cylindrical and can define a diameter sized to receive the rotatable shaft 76.

The hub 62 can be connected to the shaft 76 using any suitable coupling that rotatably couples the starwheel 50 to the shaft 76 such that the starwheel 50 rotates along with the shaft 76. In one example, the hub 62 can be coupled to the shaft 76 via a taper coupling or any alternative removable coupling that allows the starwheel 50 to rotate along with the shaft 76, and further allows the hub 62 to be rotatably decoupled from the shaft 76 when desired. Alternatively, the hub 62 can be coupled to the shaft 76 by a key, bolts, or the like. The hub 62 can have any suitable configuration. The shaft 76 can be driven to rotate directly or indirectly by an associated one of the motors 32.

The can retention assembly 63 includes an outer annular body 84 that extends radially outward from the outer radial end 72 of the front plate 64. The annular body 84 can extend axially rearward from the front end 54 of the transfer turret assembly 22, and terminates at a rear annular surface 85 that is spaced rearward from the rear annular surface 78 of the hub 62. The annular body 84 defines an inner radial surface 87 that extends axially between the front plate 64 and the rear annular surface 85. The inner radial surface 87 of annular body 84, the outer radial surface 80 of hub 62, and the front plate 64 thus define an annular void 86 configured to receive the vacuum assembly 52.

The annular body 84 can define a radially outer surface 88 that defines a base for a plurality of adjacent pockets 66. The pockets 66 are circumferentially spaced about the starwheel 50, and can be equally sized and shaped to each receive a can body 24. While the starwheel 50 is illustrated as including eighteen pockets 66, it should be appreciated that the starwheel 50 could alternatively include any number of pockets as desired.

Each pocket 66 can be arc-shaped or otherwise curved about an axial axis A'-A' which can extend substantially parallel to axis A-A. Each base 88 thus defines a pair of outer ends 90 and a middle portion 92 disposed radially inward with respect to the outer ends 90. Because the pockets 66 are disposed adjacent to each other, the outer end 90 of one pocket 66 can define the outer end 90 of the adjacent pocket 66.

Each pocket 66 can be configured to receive a can body 24 such that the curved can body surface is nested in the middle portion 92 of the curved pocket base 88. Accordingly, the can body 24 is disposed in an axially elongate orientation within the corresponding pocket 66 (see FIG. 5). It should be appreciated that the outer ends 90 can define substantially flat tangentially extending surfaces as shown in FIG. 7, or can alternatively define rounded surfaces as shown in FIG. 4. The pockets 66 and surrounding pocket structure can assume any size and shape suitable for receiving, retaining, and transferring can bodies in the manner described herein.

The can retention assembly 63 can further include an aperture 95 that extends through the middle portion 92 of the base 88 of each pocket 66 so as to provide a vacuum port. The vacuum port 95 can have a radial thickness sufficient so as to extend radially through the annular body 84. The vacuum port 95 can include an intake end 96 that is defined by the base 88 of the corresponding pocket 96, and an outlet end 94 disposed at the inner radial surface 87 of the annular body 84. The vacuum port 95 thus extends between the corresponding pocket 66 and the annular void 86 which is configured to receive the vacuum assembly 52. The retention assembly 63 can be integrally formed with the plate 64, or can be affixed by, for example, a bolted flange connection.

As will be described in more detail below, each vacuum port 95 can draw ambient air into the vacuum assembly 52 to create a negative retention pressure in each pocket 66 that sucks or biases the retained can body 24 against the pocket base 88, thereby causing each can body 24 to remain in its respective pocket 66 as the transfer starwheel 50 rotates during operation. The vacuum port 95 can thus provide a conduit for a vacuum to apply a retention force to the can bodies 24 retained in the pockets 66.

While the intake ends 96 of the vacuum ports are illustrated as being a generally circumferentially elongate rectangle, it should be appreciated that the intake end 96, and the vacuum port 95 including the outlet end 94, can assume any suitable shape and size sufficient for generating a vacuum retention force at the corresponding pockets 66. For instance, one alternative embodiment contemplates that the vacuum ports 95 could be replaced by a groove could extend radially outward from the inner surface 87 of the annular body 83 a sufficient distance so as to extend through the middle portion 92 of the base 88 of each pocket 66 so as to link the vacuum ports 96 of each pocket 66.

Referring now to FIGS. 6 and 8-10 in particular, the vacuum assembly 52 includes an annular plate 98 that can be supported by the upright support 21b. The annular plate 98 defines a radially inner end 102 having an axial thickness that defines an inner cylindrical surface 104. The inner cylindrical surface, in turn, defines a central aperture 106 that extends axially through the vacuum assembly 52. The central aperture 106 can be sized to receive the hub 62 of the starwheel 50 without contact so that the fixed vacuum assembly 52 can surround the rotating shaft 76. In certain aspects of the invention, a plurality (eight as illustrated, but could be more or less) of cut-out sections 75 (see FIGS. 1 and 11) can be formed in the front end of the annular plate 98 to decrease the overall weight of the vacuum assembly 52.

The central aperture 106 can also be sized to receive the turret shaft 76 with sufficient clearance to allow for relative rotation between the shaft 76 and the vacuum assembly 52. The shaft 76 can be supported by a bearing surface, such as that of a roller bearing 108 that is mounted onto the horizontal support 23 (see FIG. 4) to allow for shaft rotation.

Figure 9:
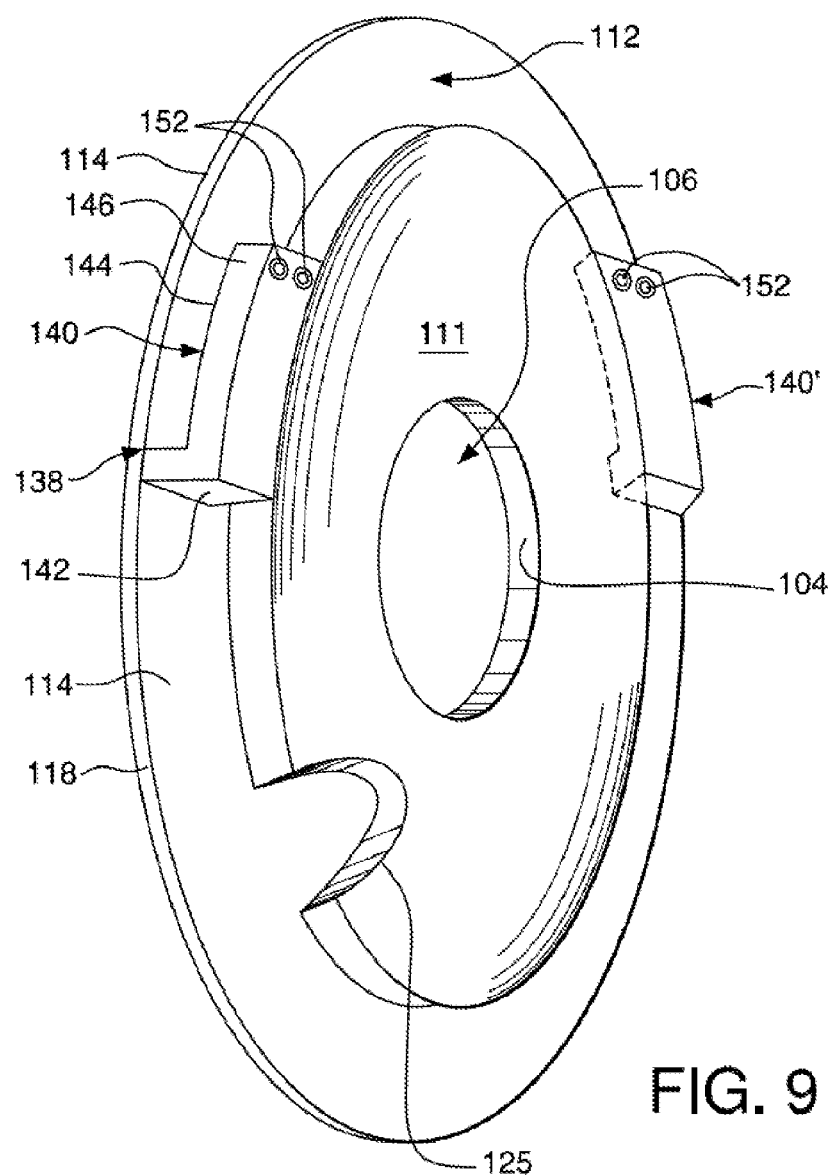
FIG. 9 is a perspective view of the vacuum assembly illustrated in FIG. 8 with portions removed for clarity.

The annular plate 98 defines a radially outer end 110 and a cavity 112 extending radially inward into the outer end 110 to define a hub 111 (see FIG. 9). The cavity 112 thus divides the outer end 110 into a front plate portion 114 and a rear plate portion 116 that are joined at the hub 111. The front plate portion 114 and the rear plate portion 116 define radially outer edges 118 and 120, respectively, that are in axial alignment with each other. The rear plate portion 116 can include a recessed plate 122 that defines a radially outer end 124 that is radially recessed with respect to the radially outer edge 120. It should thus be appreciated that the plate portions 114 and 116 can be integrally formed, or can be discreetly attached using any suitable fastener.

The plate portions 114 and 116 define a diameter that is substantially equal to the diameter of the annular void 86 configured to receive the vacuum assembly 52, but for a small clearance. Accordingly, the vacuum assembly 52 can be sized and shaped to nest within with the annular void 86, such that the front plate portion 114 can rest near the front starwheel plate 64, and the outer radial edges 118 and 120 can rest near the inner radial surface 87 of the annular body 84. The front plate portion 114 and rear plate portion 116 are disposed on opposing sides of the vacuum port 95 when the vacuum assembly 52 is installed in the annular void 86. As a result, the cavity 112 of the vacuum assembly 52 provides a channel that is in radial alignment, and in fluid communication, with the vacuum conduit of the starwheel 50. When the vacuum assembly 52 is installed in the starwheel 50, the rear end of recessed plate 122 can be rearwardly offset from the rear annular surface 85 of the outer annular body 84.

The vacuum assembly 52 can further include a vacuum infeed assembly 123 that can be connected between the cavity 112 and a vacuum source such that the vacuum source can draw air through the starwheel 50 and vacuum assembly 52. The infeed assembly 123 can include an inlet conduit 126 that extends axially into the rear plate portion 116. A linking channel 125 can extend between the circumferential cavity 112 and the inlet conduit 126 so that the cavity 112 is in fluid communication between the conduit 126 and the vacuum port 95 formed in the starwheel 50. Alternatively, the inlet conduit 126 can extend through the rear plate portion 116 at a location axially aligned with the cavity 112.

The vacuum infeed assembly 123 can further include a vacuum source inlet tube 128 that extends axially rearward from a support plate 130 that is, in turn, attached to the recessed plate 122 via a plurality of threaded fasteners 129 or the like. The inlet tube 128 can define an opening 132 that is in alignment, and fluid communication, with the vacuum source conduit 126. The inlet tube 128 can attach to a conduit 134 of a vacuum source (see FIG. 5). It should be appreciated that the tube 128 need not be cylindrical, and can assume any shape suitable to connect between the conduit 134 and the vacuum source conduit 126. In this regard, the vacuum source conduit 126 and vacuum assembly cavity 112 define a vacuum manifold 136 that can be operatively coupled to, or in fluid communication with, the vacuum port 95.

Figure 8:
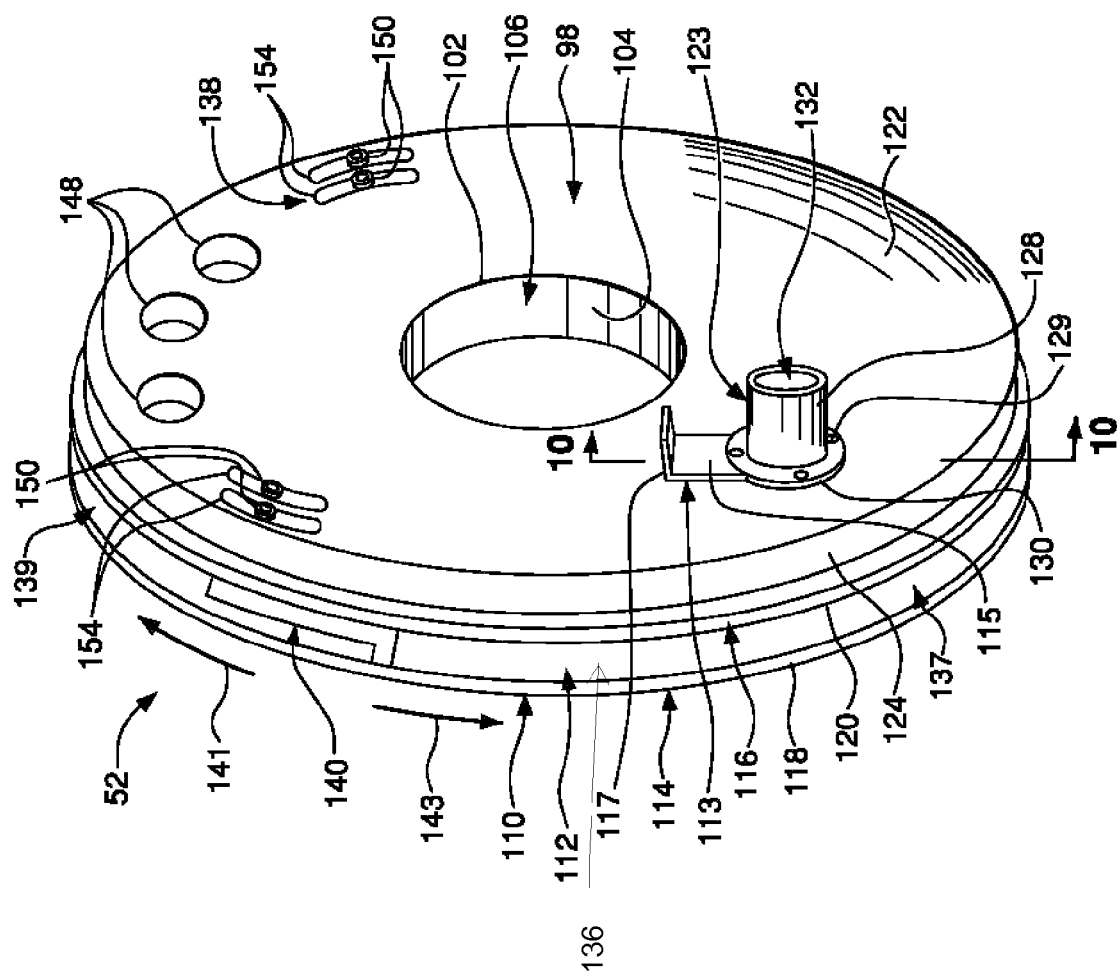
FIG. 8 is a perspective view of the vacuum assembly illustrated in FIG. 5.
Figure 10:
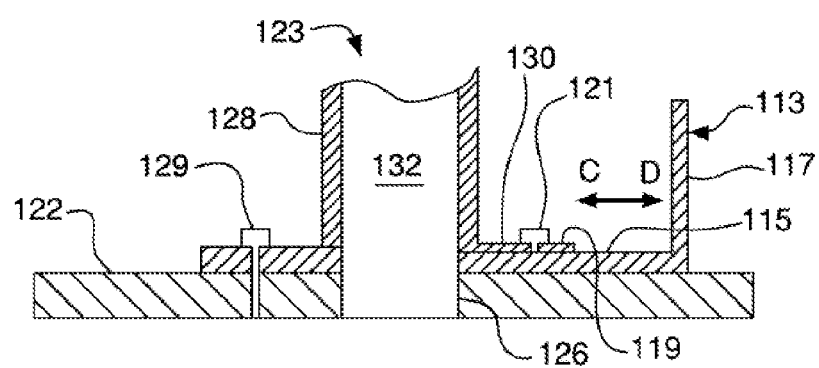
FIG. 10 is a sectional side elevation view of the vacuum assembly taken along line 10-10 in FIG. 8.

Referring now to FIGS. 8 and 10 in particular, the vacuum infeed assembly 123 can further include a vacuum adjustment valve 113 having a vacuum adjustment plate 115 extending parallel to the annular plate 98, and a handle 117 extending out from the vacuum adjustment plate 115. The adjustment plate 115 is sized to fit through a slot 119 formed in the support plate 130, and can slide into the opening 132 along the direction of Arrow C to reduce airflow through the transfer turret assembly 22, and out of the opening 132 in the direction of Arrow D to increase airflow through the transfer turret assembly 22. A threaded set screw 121 can extend through an axial threaded opening formed in the support plate 130, and can be tightened against the vacuum adjustment plate 115 to lock the position of the plate 115. The set screw 121 can be loosened when the position of the vacuum adjustment plate 115 is to be adjusted.

The valve 113 allows the vacuum distribution throughout the can necking machine 10 to be "tuned," or adjusted, as the transfer turrets of all transfer turret assemblies 22 can be connected to a common centralized vacuum source. For instance, if it was determined that more vacuum was required at the infeed of the machine to ensure that the can bodies were securely picked up at the desired speed, then the valves 113 can be adjusted to bias the vacuum towards the infeed end of the machine 10.

Referring now to FIGS. 6, 8, 9, and 11, the vacuum assembly 52 further includes an adjustable baffle assembly 138 that can include a pair of opposing baffle plates 140 and 140' disposed in the cavity 112. Baffle plate 140 is disposed upstream with respect to baffle plate 140', it being appreciated that the terms "upstream" and "downstream" are used herein relative to the direction of rotation of the starwheel 50. Baffle plates 140 and 140' are similarly constructed, and baffle plate 140 will be described, it being appreciated that the description of baffle plate 140 is applicable to baffle plate 140' unless otherwise specified.

The baffle plate 140 includes a separation leg 142 that extends axially rearward from the front plate portion 114, and terminates at the rear plate portion 116. The separation leg 142 extends radially between the hub 111 and the outer radial edges 118 and 120, and defines an outer radial edge 144 that is in axial alignment with the outer radial edges 118 and 120. A positioning arm 146 extends circumferentially outward from the rear end of the separation leg 142. In one embodiment, the positioning arms 146 extend in a direction toward the upper end 58 of the transfer turret assembly 22, though they could alternatively extend in a direction toward the lower end 60.

The separation leg 142 provides a boundary that separates the vacuum assembly cavity 112 into a first active vacuum zone 137 and a second vacuum abatement zone 139. Specifically, the active vacuum zone 137 can be defined as that portion of the cavity 112 disposed between the separation legs 142 and 142' of each baffle plate 140 and 140' that is also in sufficient fluid communication with the inlet opening 132 to produce a retention force at the pockets 66 that are operably aligned and in communication with the active vacuum zone 137. The active vacuum zone 137 thus defines a channel in fluid communication between the vacuum ports 95 and the inlet opening 132.

The vacuum abatement zone 139 can be defined as that portion of the cavity 112 that extends between the separation legs 142 and 142', and can further be defined as that portion of the cavity 112 that is occupied by the separation legs 142 and 142'. The separation legs 142 and 142' prevent or limit air from being drawn into the inlet opening 132 from the abatement zone 139 of the cavity 112. The baffle plates 140 and 140' can thus be said to define respective boundaries that separate the abatement zone from the infeed conduit 126. The abatement zone 139 can thus provide a chamber that is operably isolated from the vacuum infeed conduit 126, meaning that an insufficient level of vacuum pressure is present in the abatement zone 139 that would create a retention force sufficient to retain the can bodies 24 in their respective pockets 66.

It should thus be appreciated that the air pressure in the abatement zone 139 may not be precisely ambient. For instance, air in the abatement zone 139 can leak into the vacuum zone 137 due to clearance between the vacuum assembly 52 and the starwheel 50. However, the negative pressure in the pockets 66 aligned with the abatement zone 139 is insufficient to create a retention force in the pockets 66 that would bias the can bodies against the base 88 to retain the can bodies. The abatement zone 139 is thus at least partially removed from fluid communication with the vacuum source. The pockets 66 that do not receive a retention force can thus be said to be operably disconnected from, or in inoperable fluid communication with, the vacuum zone 137. The present invention further contemplates embodiments that prevent any vacuum airflow from entering the vacuum abatement zone 139, and intend to include such embodiments as providing pockets that are operably disconnected from the vacuum zone 137. Pockets 66 that receive the retention force can be said to be operably connected to, or in operable fluid communication with, the vacuum zone 137.

In the illustrated configuration, the abatement zone 139 is disposed in the upper end 58 of the transfer turret assembly 22, though the present invention is not intended to be limited to the illustrated configuration. The abatement zone 139 could be disposed in the lower end 60 of the transfer turret assembly 22, or could span between the upper and lower portions of the transfer turret assembly 22.

In the illustrated embodiment, those pockets 66 that are operatively coupled to the vacuum zone 137 are in radial alignment with the vacuum zone 137 at the corresponding location of their rotation, while the pockets 66 operatively disconnected from the vacuum zone are in radial alignment with the abatement zone 139. It should be appreciated however, that the starwheel 50 and vacuum assembly 52 could be configured to provide a vacuum manifold that places pockets 66 not radially aligned with the vacuum zone 137 in operable fluid communication with the vacuum zone 137.

A plurality of pressure dissipation openings 148 can extend through the rear plate portion 116 to place the abatement zone 139 in fluid communication with the ambient environment, thereby allowing pressure that may exist either in the abatement zone 139 or in the portion of cavity 112 that is in alignment with the abatement zone 139 to dissipate, thereby ensuring that a retention force is not applied to can bodies within pockets that are aligned with the abatement zone 139 during operation.

The baffle plate 140, and hence baffle plate 140', is attached to the annular plate 98 via a positioning member in the form of a pair of positioning pins 150. Specifically, the baffle plate 140 can include a pair of radially spaced apertures 152 that can extend into the positioning arm 146. The apertures 152 can be threaded so as to receive the threaded end of the positioning pins 150. The pins 150 extend axially rearward from the apertures 152 and through a corresponding pair of adjustment openings 154 formed in the rear plate portion 116. Each adjustment opening 154 can be arc shaped and can extend substantially parallel to the radially outer edges 118 and 120 of the annular plate 98, and can extend axially through the rear plate portion 116 in circumferential alignment with the corresponding aperture 152.

Each positioning pin 150 can define a head that has a diameter greater than the radial thickness of the adjustment opening 154. Alternatively, or additionally, a washer can be disposed between the rear plate portion 116 and the fastener head 156. The positioning pins 150 can be rotated in a first direction to tighten against the rear plate portion 116, thereby fixing the position of the corresponding baffle plate 140 or 140' in the cavity 112. The positioning pins 150 can be rotated in a second opposite direction to loosen the head 156 from the rear plate portion 116. The corresponding baffle plate 140 or 140' can then be manually translated in the direction of the adjustment opening 154 guided by the positioning pins 150. Translation of the baffle plate 140 or 140' in one circumferential direction 141 can reduce the circumferential length of the ambient portion 139, and translation of the baffle plate in the opposite circumferential direction 143 can increase the circumferential length of the ambient portion 139.

Referring also to FIG. 11, during operation, the transfer starwheel 50 rotates in a direction D, which can be counterclockwise as illustrated. During rotation, the inner radial surface 87 of the starwheel 50 (see FIG. 7) rides along the radially outer edges 118 and 120 of annular plate 98 (see FIG. 8). The rotating starwheel pockets 66 receive a can body 24 at an infeed position 160, and discharge the can body 24 at a discharge position 162. The infeed position 160 and discharge positions 162 define an arc of travel for each can body that is less than an entire starwheel revolution. The can bodies 24 disposed in each pocket 66 rotate along the direction of Arrow D from the infeed position 160 to a discharge position 162. The can bodies 24 exit the pocket 66 after traveling past the discharge position 162 when the retention force has abated, and are transferred to the downstream process station. It should thus be appreciated that the infeed position 160 is in juxtaposition with, and at least partially defined by, the baffle plate 140', and the discharge position 162 is in juxtaposition with, and at least partially defined by, the baffle plate 140.

As the starwheel 50 rotates, the vacuum source draws air through the vacuum assembly inlet 134, which causes air to be drawn through the vacuum port 95 formed in each pocket 66 that is aligned with the vacuum zone 137. The air further travels from, those vacuum conduits 95 that are aligned with the vacuum zone 137, and through the active vacuum zone 137 in the vacuum assembly cavity 112. The vacuum pressure in each pocket 66 aligned with the vacuum zone 137 causes a retention force that biases the retained can bodies 24 against the pocket base 88 of pockets 66 that are rotating between the infeed position 160 and the discharge position 162. As each pocket 66 is rotated into alignment with the upstream end of the vacuum abatement zone 139, the vacuum pressure in the vacuum conduit 95 and corresponding retention force abates, thereby allowing the can body 24 to exit the pocket 66 at the discharge position 162. The vacant pocket 66 can receive another can body at the infeed position 160.

It should be appreciated that adjusting the position of the upstream baffle plate 140' adjusts the angular location of the upstream end of the active vacuum zone 137, and thus also adjusts the angular location of the infeed position 160, and adjusting the position of the downstream baffle plate 140 adjusts the angular location of the downstream end of the vacuum zone 137, and thus also adjusts the angular location of the discharge position 162. It should be further appreciated that the angular locations of the infeed position 160 and discharge position 162 are independently adjustable. Alternatively, the baffle plates 140 and 140' could be connected such that the angular location of the infeed position 160 and discharge position 162 are adjustable in concert. Alternatively still, one of the baffle plates 140 and 140' could be adjustable while the other baffle plate has a fixed position.

Certain aspects of the invention thus recognize that one may wish to adjust the angular location of the infeed position 160, the discharge position 162, or both. For instance, increasing the rotational, or angular, speed of the starwheel 50 causes the retained can bodies 24 to travel a greater circumferential distance per unit time after the vacuum retention force abates. Conversely, decreasing the rotational speed of the starwheel 50 causes the retained can bodies 24 to travel a shorter circumferential distance per unit time after the vacuum retention force abates. Factors such as the force required to retain an incoming can at higher speed, the time lag from when a pocket comes into the active vacuum zone 137 to when sufficient negative pressure is achieved, and like parameters are considerations in determining the position of baffles 140 and 140'. For instance, it may be desirable to position the downstream baffle plate 140 upstream for high starwheel rotational speeds (that is, shorten the active vacuum zone 137), and downstream for lower starwheel rotational speeds (that is, to widen the active vacuum zone 137).

The position of the upstream baffle plate 140 can likewise be adjusted, for instance, to ensure that the can bodies are reliably received from a discharge of the upstream process station.

A method of operating the transfer turret assembly 22 thus includes rotating the starwheel 50 relative to the vacuum assembly 52 at a first rotational speed while at least one of the baffle plates 140 and 140' is disposed at a first position, applying a vacuum retention force to the pockets 66, subsequently adjusting the location of at least one of the baffle plates 140 and 140', and rotating the starwheel 50 relative to the vacuum assembly 52 at a second rotational speed which can differ from the first rotational speed. The final position of baffle plates 140 and 140', and whether each is moved upstream or downstream in response to an increase or decrease in starwheel rotational speed (or in response to other factors) can depend upon the particular machine configuration, operating parameters, vacuum conditions, can parameters, and the like.

The foregoing description is provided for the purpose of explanation and is not to be construed as limiting the invention. Although the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the present invention as defined by the appended claims.

What is claimed:

1. A transfer turret assembly for a can necking machine, the transfer turret assembly comprising:
    a rotatable transfer starwheel configured to transfer can bodies between can pockets of a first process station and can pockets of a second process station, the transfer starwheel including a plurality of peripheral pockets, each peripheral pocket adapted to receive a can body and including a vacuum port; and
    at least one adjustable baffle that has an adjustable position relative to either an infeed position or a discharge position;
    wherein the peripheral pockets are adapted to rotate between the infeed position, in which a retaining airflow is applied through the vacuum port, and the discharge position, in which the retaining airflow from the vacuum port is removed, and wherein at least one of the infeed position and the discharge position is adjustable relative to the other by the at least one adjustable baffle to enable adjustment of the at least one of the infeed position and discharge position relative to the corresponding can pocket of the process station.

2. The transfer turret assembly as recited in claim 1, wherein the infeed and discharge positions at least partially define an active vacuum zone and a vacuum abatement zone separated by the at least one adjustable baffle.

3. The transfer turret assembly as recited in claim 2, further comprising a vacuum assembly juxtaposed with the transfer starwheel such that the starwheel is rotatable about the vacuum assembly, wherein the vacuum assembly comprises a channel operable to apply a vacuum retention force to some but not all of the vacuum ports.

4. The transfer turret assembly as recited in claim 3, further comprising a chamber separated from the channel by the at least one adjustable baffle, wherein the channel is in fluid communication with a vacuum source inlet.

5. The transfer turret assembly as recited in claim 3, further comprising a valve configured to adjust a magnitude of airflow through the channel.

6. The transfer turret assembly as recited in claim 1 comprising two adjustable baffles.

7. The transfer turret assembly as recited in claim 6, wherein one of the baffle plates is configured to have a fixed angular position and the other baffle plate is configured to have an adjustable angular position.

8. The transfer turret assembly as recited in claim 6, wherein both of the baffle plates are configured to have adjustable angular positions.

9. The transfer assembly as recited in claim 8, wherein each of the baffle plates is independently adjustable.

10. The transfer assembly as recited in claim 1, wherein the infeed position and the discharge position define an adjustable circumferential length along which the retaining airflow is applied to peripheral pockets.

11. The transfer assembly as recited in claim 10, wherein the adjustable circumferential length is configured to be adjusted according to a desired starwheel rotational speed.

12. The transfer assembly as recited in claim 2, wherein the active vacuum is in fluid communication with a vacuum source and at least a plurality of the vacuum ports.

13. The transfer assembly as recited in claim 12, further comprising a valve configured to adjust a magnitude of airflow through the at least a plurality of the vacuum ports.

14. The transfer assembly as recited in claim 12, wherein the vacuum abatement zone is at least partially removed from fluid communication with the vacuum source.

15. The transfer assembly as recited in claim 2, wherein the active vacuum zone is further defined by a vacuum manifold.

16. The transfer assembly as recited in claim 1, wherein the adjustable position is an adjustable angular position.

17. The transfer assembly as recited in claim 1, wherein the adjustable position is capable of tuning.

18. The transfer assembly as recited in claim 1, wherein each one of the infeed position and the discharge position is adjustable.

\* \* \* \* \*